United States Patent
King et al.

(10) Patent No.: US 6,170,510 B1
(45) Date of Patent: *Jan. 9, 2001

(54) TANK VENTING CONTROL SYSTEM

(75) Inventors: Timothy J. King, Connersville; Barry S. Chestnut, Richmond, both of IN (US)

(73) Assignee: Stant Manufacturing Inc., Connersville, IN (US)

( * ) Notice: Under 35 U.S.C. 154(b), the term of this patent shall be extended for 0 days.

This patent is subject to a terminal disclaimer.

(21) Appl. No.: 09/385,528

(22) Filed: Aug. 30, 1999

Related U.S. Application Data

(62) Division of application No. 08/853,530, filed on May 9, 1997, now Pat. No. 5,944,044.
(60) Provisional application No. 60/045,709, filed on May 6, 1997.

(51) Int. Cl.[7] .................................................. F16K 24/04
(52) U.S. Cl. ............................................. 137/202; 137/43
(58) Field of Search ......................................... 137/43, 202

(56) References Cited

U.S. PATENT DOCUMENTS

| | | |
|---|---|---|
| 4,655,238 | 4/1987 | Szlaga . |
| 4,905,726 | 3/1990 | Kasugai et al. . |
| 5,028,244 | 7/1991 | Szlaga . |
| 5,215,132 | 6/1993 | Kobayashi . |
| 5,234,013 | 8/1993 | Roetker et al. . |
| 5,449,029 | 9/1995 | Harris . |
| 5,535,772 | 7/1996 | Roetker et al. . |
| 5,566,705 | 10/1996 | Harris . |
| 5,577,526 | 11/1996 | Kasugai et al. . |
| 5,590,697 | 1/1997 | Benjey et al. . |
| 5,694,968 | 12/1997 | Devall et al. . |
| 5,944,044 | * 8/1999 | King et al. ........................ 137/202 |

* cited by examiner

*Primary Examiner*—Gerald A. Michalsky
(74) *Attorney, Agent, or Firm*—Barnes Thornburg

(57) ABSTRACT

An apparatus is provided for controlling discharge of fuel vapor from within a vehicle fuel tank. The apparatus includes a valve container with an inlet, an outlet, and a chamber, a valve member formed for movement between an open position allowing fuel vapor flow through outlet and a closed position blocking fuel vapor flow through outlet, and a secondary float valve disposed between inlet and valve member. The valve member includes a central post and wing segments defining flow passages sized to permit fuel vapor flow therethrough and to block momentarily liquid fuel flow therethrough. The secondary float valve moves between an open position allowing fuel vapor flow to the wing segments and a closed position blocking liquid fuel flow to the wing segments.

21 Claims, 11 Drawing Sheets

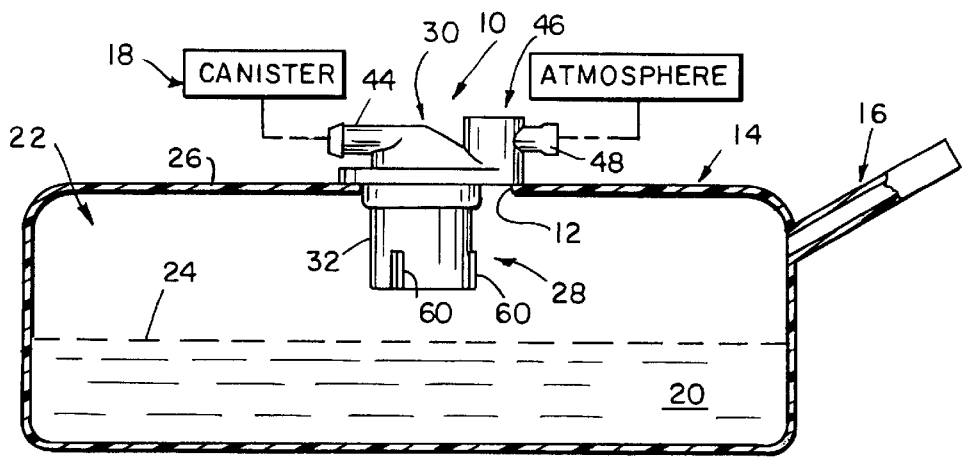
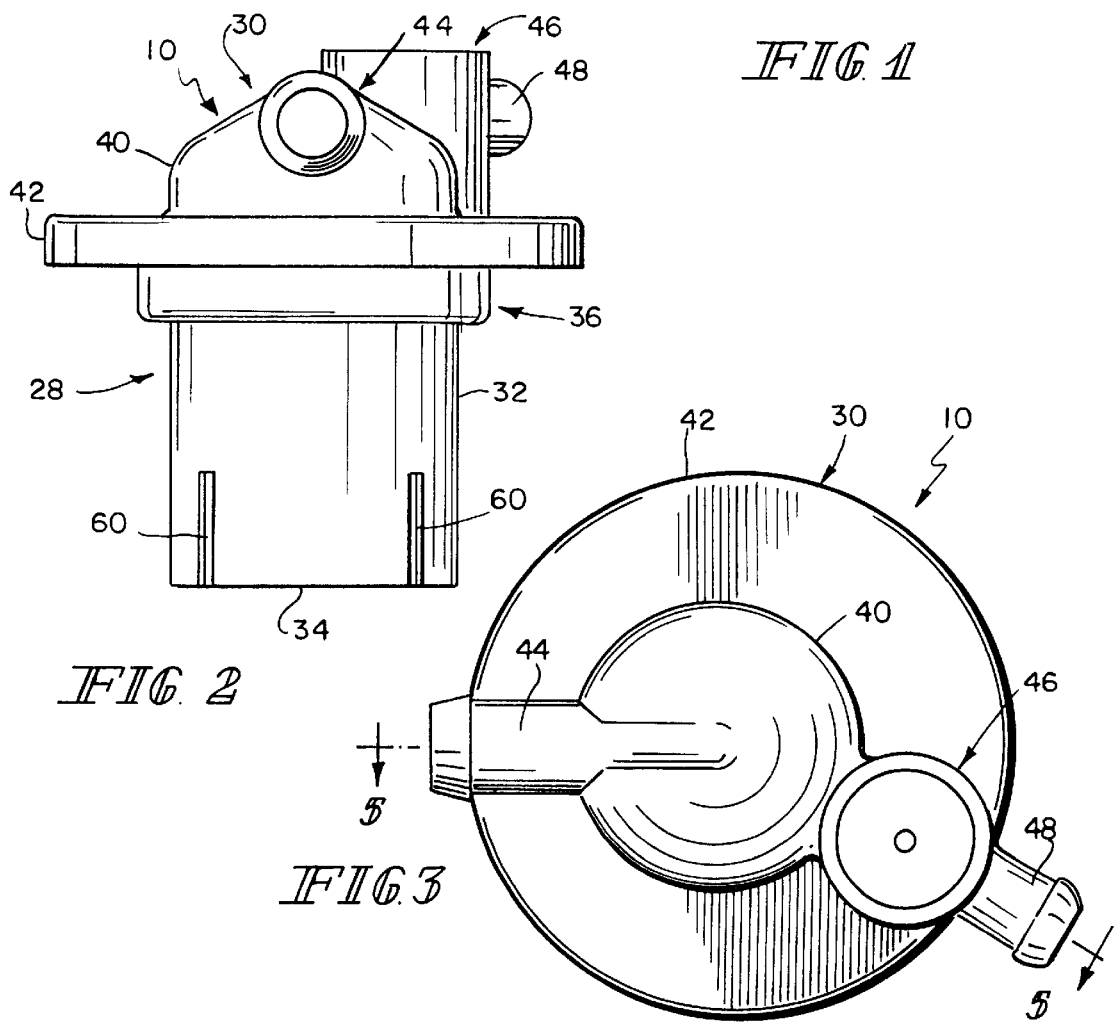
FIG. 1
FIG. 2
FIG. 3

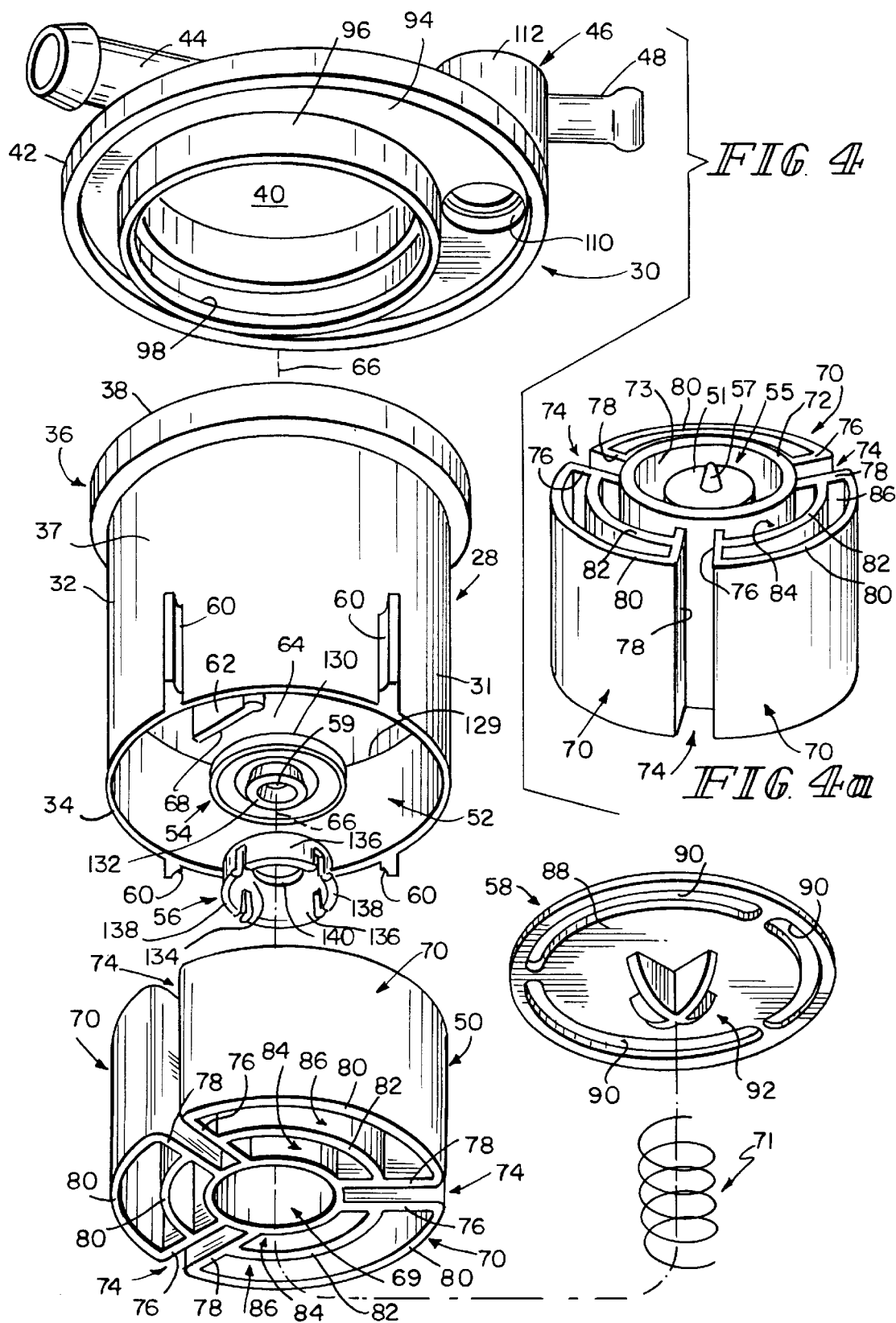

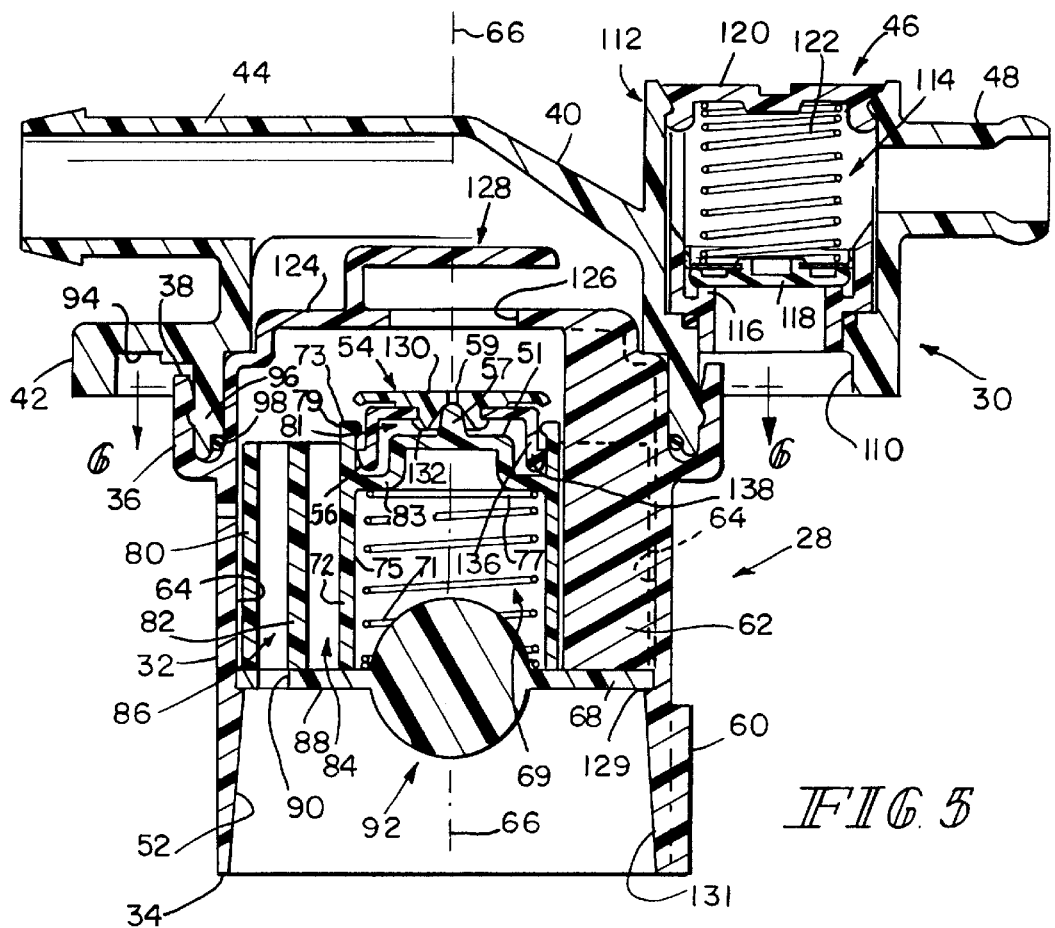
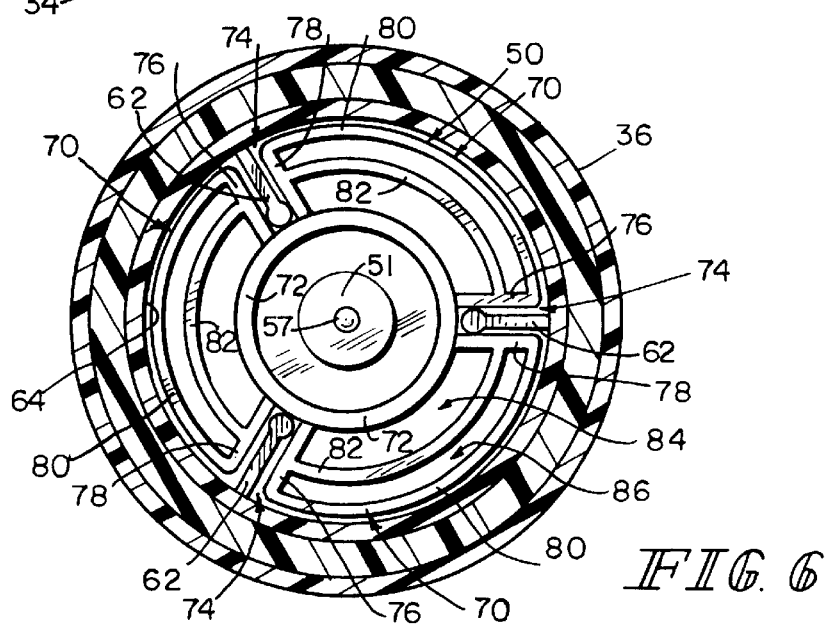

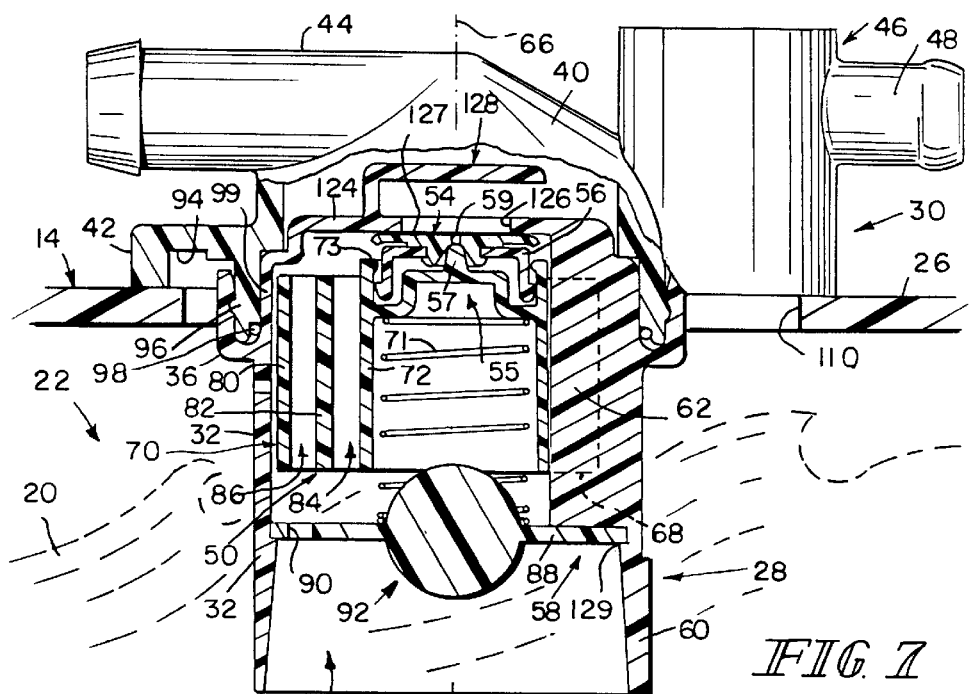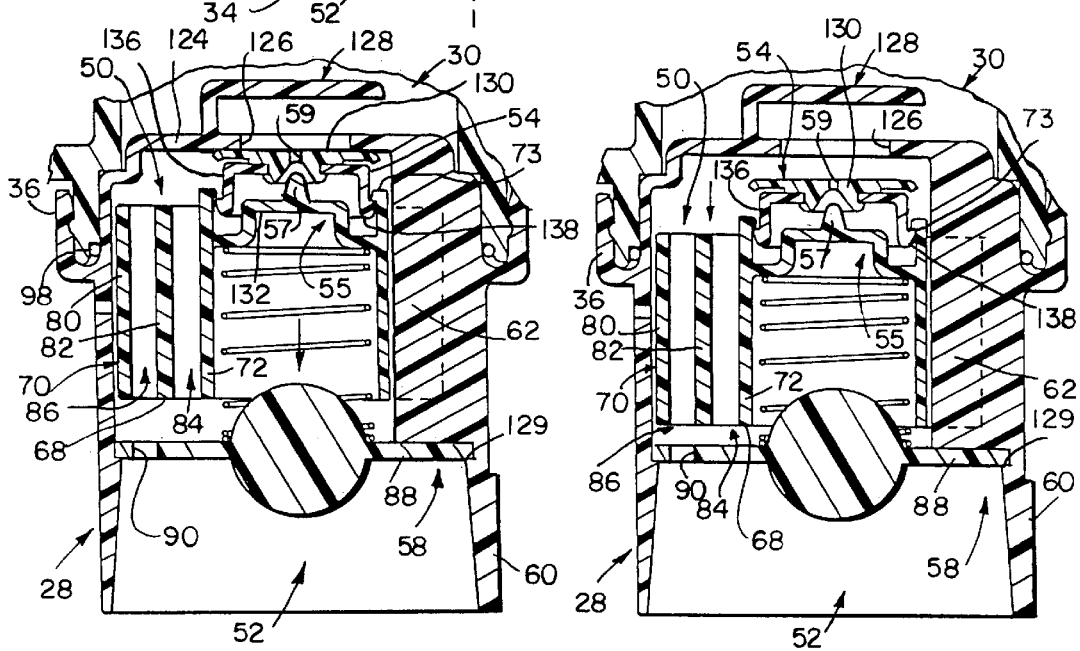
FIG. 7
FIG. 8
FIG. 9

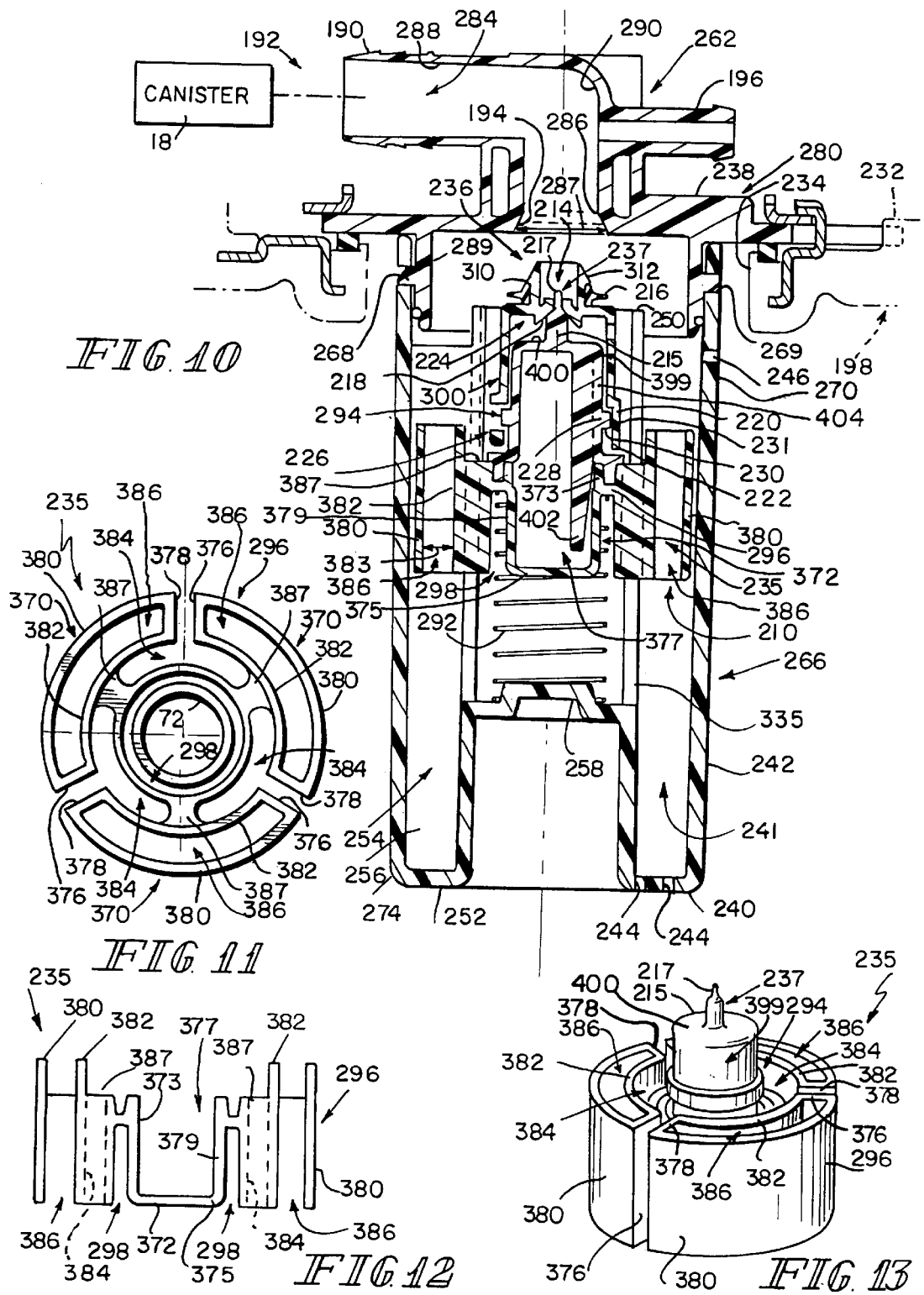

TANK VENTING CONTROL SYSTEM

This application is a division of U.S. application Ser. No. 08/853,530, filed May 9, 1997, now U.S. Pat. No. 5,944,044, which claims the benefit of U.S. Provisional Application Ser. No. 60/045,709, filed May 6, 1997.

BACKGROUND OF THE INVENTION

The present invention relates to tank pressure-control system, after and particularly, to an apparatus for regulating discharge of liquid fuel and fuel vapor from a fuel tank. More particularly, the present invention relates to a tank venting control apparatus that closes quickly and automatically at the proper time to prevent discharge of agitated liquid fuel from the tank and overfill of the tank and that opens automatically at some point after fuel agitation has subsided or tank refueling has ended to vent the vapor space in the tank.

Some conventional buoyant float members of the type used in tank control valves are unable to react quickly enough to rising liquid fuel in the tank to move a tank closure valve to its vent-closing position in the tank. Often, a float member moves upwardly to urge the tank closure valve to a position closing a venting outlet in the tank only when a sufficient amount of liquid fuel in the tank is displaced by the float member. This displacement must generate enough buoyant force (to add to the lifting force generated by a compression spring acting on the bottom of the float member) to lift the float member upwardly to close the venting outlet in the fuel tank. Many conventional float members have somewhat open-ended bottom portions. These open-ended bottom portions do not displace a lot of liquid fuel when met with rising liquid fuel in a tank. Therefore, there might be a delay period between the time that such a conventional float member is first exposed to rising liquid fuel and the time that the float member begins to float and move a closure valve upwardly to its vent-closing position in the fuel tank.

Some tank closure valves of the type used in tank venting control systems also have a tendency to remain "stuck" in their closed positions. This sticking can prolong the closure of the venting outlet in the fuel tank. Such closure can continue during high tank pressure conditions for a period of time after the liquid fuel level in the tank has fallen far enough so the float member and tank closure member would ordinarily "fall" in the tank away from the venting outlet. The prolonged closure of the closure valves often occurs because of a high-pressure differential that acts on such tank closure valves. This is especially evident when the venting outlet in the fuel tank has a relatively large inner diameter. What is needed is tank venting control apparatus that includes a float member that jerks to a closed position when exposed to rapidly rising liquid fuel during sloshing conditions, but relies primarily on buoyancy during normal refueling conditions. What is also needed is a fill-limit valve assembly that includes a closure valve that falls away from the venting outlet when the liquid fuel in the tank has lowered in the fuel tank.

According to the present invention an apparatus is provided for controlling discharge of fuel vapor from within a vehicle fuel tank. The apparatus comprises a valve container adapted to be mounted in a top wall of the fuel tank and a valve member. The valve container is formed to include an inlet in fluid communication with the fuel tank, an outlet, a side wall extending between the inlet and outlet, and a chamber in fluid communication with the inlet and the outlet. The valve member is disposed in the chamber and formed for movement between an open position allowing flow of fuel vapor through the outlet and a closed position preventing flow of fuel vapor through the outlet. The valve member includes a central post and wing segments positioned to lie in a spaced apart relationship about the post. The wing segments are formed to define flow passages therethrough that are sized to permit the flow of fuel vapor therethrough and to momentarily block the flow of liquid fuel therethrough.

According to another embodiment of the present invention, a fuel vapor control valve is provided for controlling the flow of fuel vapor and liquid fuel through an aperture in a fuel tank having a filler neck. The fuel vapor control valve comprises a housing mounted in the aperture and formed to include an inlet in fluid communication with the fuel tank, an outlet, a side wall extending between the inlet and the outlet and defining a chamber disposed between the inlet and the outlet. Control valve also includes a base coupled to the side wall of the housing and being formed to include a slot therethrough, an upper closure member configured for selectively interrupting the flow of fuel vapor through the outlet, and a valve member formed for movement in the chamber between the outlet and the base. The valve member includes a post movably coupled to the closure member and a wing segment coupled to the post. The wing segment defines a flow passage that is sized to permit the flow of fuel vapor therethrough and to retard the flow of liquid fuel therethrough.

According to yet another embodiment of the present invention a float member is provided that is suitable for use in a tank venting control system for regulating discharge of fuel vapor from within a vehicle fuel tank. The float member comprises a central post that has an upper end and an opposite lower end and is formed to define a cavity between the upper and lower ends. A dome portion is coupled to the central post and is configured to extend across the cavity adjacent the upper end. Further, float valve includes wing segments positioned to lie in a spaced apart relationship about an outer circumference of the central post. Each of the wing segments includes an exterior wall and an opposite interior wall coupled to the central post. The exterior and interior walls cooperate to define a flow passage therebetween. In addition, the flow passage permits fuel vapor to flow freely therethrough and retards liquid fuel flow therethrough.

Additional objects, features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which:

FIG. 1 is a diagrammatic view of a tank venting control apparatus in accordance with the present invention mounted in a fuel tank having a filler neck;

FIG. 2 is a side elevation view of the tank venting control apparatus of FIG. 1 showing the control assembly including a container lid and a valve container;

FIG. 3 is a top plan view of the tank venting control apparatus of FIG. 2 showing the container lid including a closure shell, a first output tube, a pressure-relief module, and a second output tube;

FIG. 4 is an exploded assembly view of components included in the tank venting control apparatus of FIGS. 1–3 showing the container lid, the valve container, an upper closure member and an underlying support frame that cooperate to close and open a venting outlet formed in the valve container and shown in FIG. 5, a float member formed to include a central post and three pie-shaped wing segments arranged to lie around the central post, a spring, and a base;

FIG. 4a is a perspective view of the float member of FIG. 4 showing the float member having three wing segments, each with two axially extending flow passages, appended to the central post, a lower closure member including a dome appended to the central post, and an upright nipple appended to the dome;

FIG. 5 is a sectional elevation view of the tank venting control apparatus of FIGS. 1–4 taken along line 5—5 of FIG. 3 showing the lower closure member of the float member and the upper closure member in a lowered position away from the venting outlet formed in the valve container;

FIG. 6 is a transverse sectional view taken along line 6—6 of FIG. 5 showing the valve container including spaced-apart guide ribs and a chamber and the float member being positioned to lie within the chamber and in engagement with the guide ribs;

FIG. 7 is a view similar to FIG. 5 showing upward movement of the float member during fuel sloshing or the like to move upper closure member in an upward direction to close the tank venting outlet formed in the valve container so that liquid fuel carryover from the fuel tank is prevented;

FIG. 8 is a view similar to FIG. 7 showing later downward movement of the lower closure member of the float member in response to falling levels of liquid fuel in the fuel tank to open a bypass aperture in the upper closure member so that fuel vapor can vent through the bypass aperture while the upper closure member remains in its closed position;

FIG. 9 is a view similar to FIGS. 7 and 8 showing downward movement of the upper closure member to an opened position allowing maximum venting through the tank venting outlet as a result of downward force applied to the upper closure member, at least in part, by outwardly extending flanges provided on the float member as the lower closure member of the float member sink in the fuel tank;

FIG. 10 is an enlarged transverse sectional detail view of a tank venting control apparatus in accordance with another embodiment of the invention showing a tubular skirt around a rollover valve assembly that includes a float member;

FIG. 11 is a top plan view of the float member included in the embodiment of FIG. 10 showing the float member including a central post, three wing segments coupled to the central post, each having an exterior wall and an interior wall that cooperate to define a flow passageway, and three spaced apart T-shaped slots that extend between the wing segments and the central post;

FIG. 12 is a side elevation view of the float member of FIG. 11 showing the central post defining a cavity, a bridge coupling the interior wall of the wing segment to the post, and the bridge defining a spring-receiving notch between the interior wall and the post;

FIG. 13 is a perspective view of the float member of FIGS. 10–12 showing a lower closure coupled to the post;

DETAILED DESCRIPTION OF THE DRAWINGS

Figure 14:
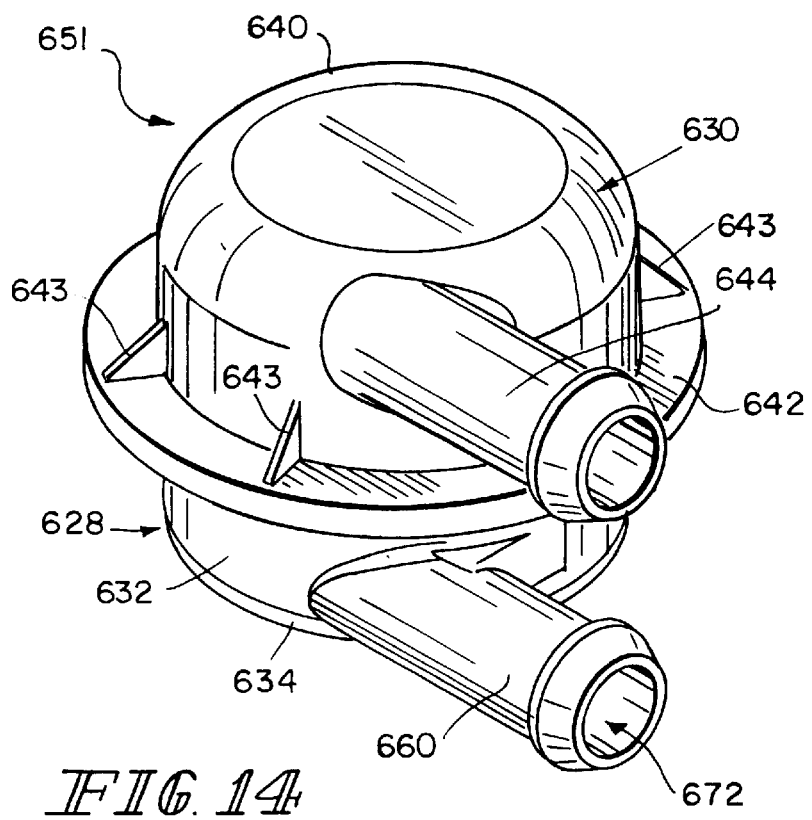
FIG. 14 is a perspective view of a tank venting control apparatus in accordance with another embodiment of the present invention showing a vent apparatus, an outlet tube coupled to the vent apparatus, a valve container, and an inlet tube coupled to the valve container.
Figure 15:
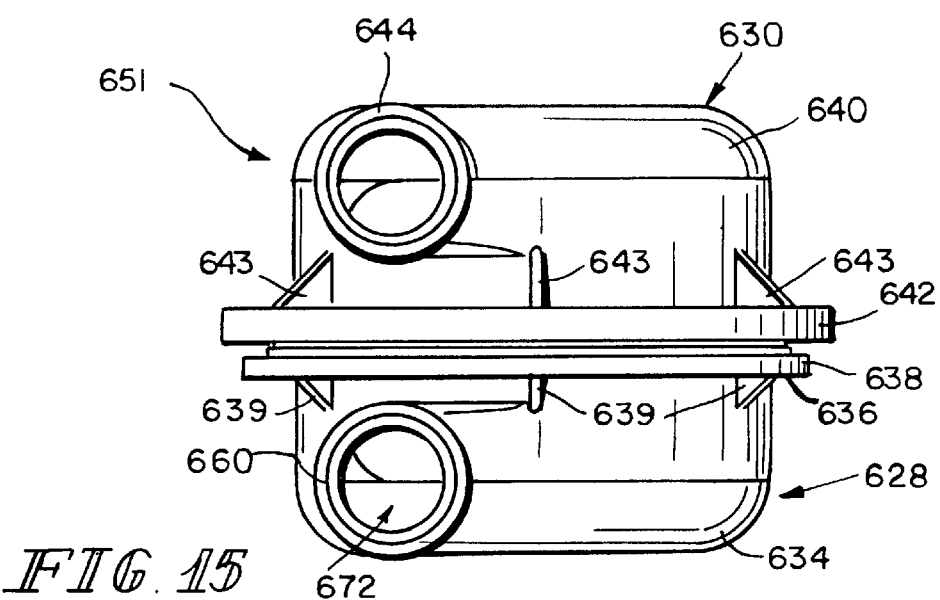
FIG. 15 is a side elevation view of the tank venting control apparatus of FIG. 14 showing the relative positioning of the inlet tube and the outlet tube.
Figure 16:
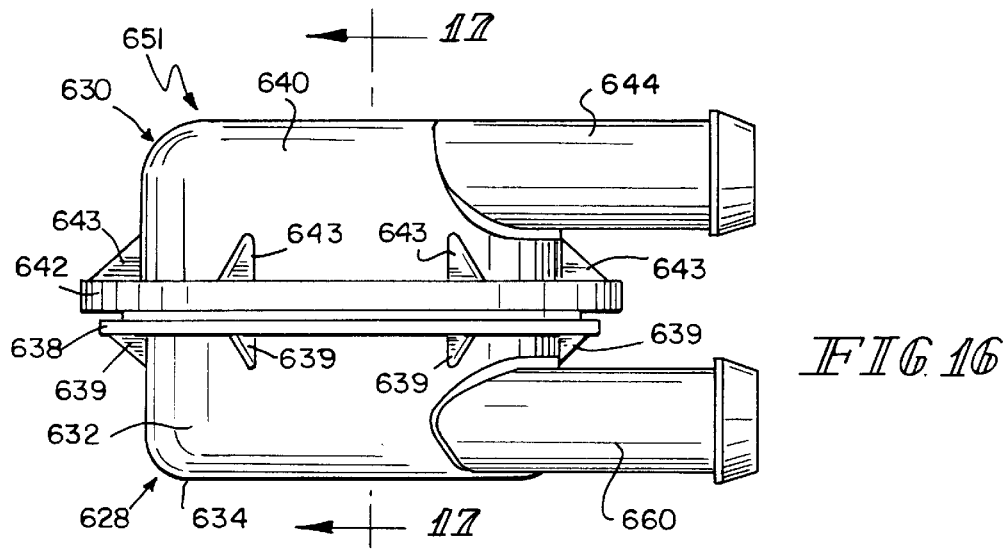
FIG. 16 is a front elevation view of the tank venting control apparatus of FIGS. 15 and 16.

A valve assembly 10 is mounted in an aperture 12 formed in a fuel tank 14 having a filler neck 16 as shown in FIG. 1 to regulate flow of liquid fuel and fuel vapor from tank 14 to a vapor recovery canister 18 or other destination outside tank 14. Valve assembly 10 includes a float member 50 that jerks to a closed position when exposed to rapidly rising liquid fuel 20 in the fuel tank 14. Float member 50 will remain in the closed position, due to its buoyancy so long as the liquid fuel 20 remains elevated above a pre-determined level within the tank 14. The valve assembly 10 can be welded in place to tank 14 or coupled to tank 14 using an O-ring seal (not shown). Tank 14 contains liquid fuel 20 that is introduced into the tank 14 through filler neck 16 using a conventional fuel-dispensing pump nozzle (not shown). The space 22 in tank 14 above top surface 24 of liquid fuel 20 and below top wall 26 of tank 14 is known as the "vapor space" and contains fuel vapor extant in tank 14. Valve assembly 10 operates to vent pressurized fuel vapor from vapor space 22 at the proper time and also operates to block unwanted discharge of liquid fuel 20 and fuel vapor from tank 14 through the aperture 12 formed in top wall 26 of tank 14.

As shown in FIGS. 2–4, valve assembly 10 includes a valve container 28 and a container lid 30. The valve container 28 defines a chamber 52 therein. Valve container 28 also includes a cylindrical sleeve 32 having an annular lower rim 34, an upper flange 36 defining an annular upper rim 38, and a side wall 37. Container lid 30 includes a closure shell 40, an annular mounting flange 42 depending from closure shell 40, a first output tube 44 coupled to closure shell 40, a pressure-relief module 46 coupled to closure shell 40, and a second output tube 48 coupled to pressure-relief module 46 for venting fuel vapor to the atmosphere.

More details of one embodiment of valve assembly 10 are shown in FIG. 4. Valve assembly 10 further includes a float member 50 sized to fit into and move up and down in the chamber 52 formed in valve container 28, an upper closure member 54, a frame 56 configured to support upper closure member 54 and connect to float member 50 to allow for some limited axial movement of float member 50 relative to upper closure member 54, and a base 58. The base 58 is coupled to the cylindrical sleeve 32 and lies in a float member-supporting position underneath the movable float member 50.

Referring to FIGS. 4 and 5, valve container 28 also includes external axially extending ribs 60 spaced apart about the circumference of an outer surface 31 of cylindrical sleeve 32. Illustratively, three axially extending, sheet-like guide ribs 62 are positioned to lie spaced apart about in container chamber 28. One edge of each guide rib 62 is anchored to an inner surface 64 of cylindrical sleeve 32 and each guide rib 62 extends in a radial direction from that inner surface 64 toward a central axis 66 extending axially through valve container 28. The three guide ribs 62 in the illustrated embodiment are uniformly spaced apart at 1200 intervals (as shown best in FIG. 6) and function to mate with the axially movable float member 50 and block rotation of float member 50 relative to cylindrical sleeve 32 during axial movement of float member 50 in container chamber 52 along central axis 66 relative to cylindrical sleeve 32. Each guide rib 62 includes a lower edge 68 for engaging base 58 once base 58 is mounted in container chamber 58 as shown in FIG. 5. Each guide rib 62 is integrally appended to cylindrical sleeve 32 in the illustrated embodiment. Although three guide ribs 62 are illustrated, it is understood that greater or fewer than three guide ribs 62 may be mounted in container chamber in accordance with the present invention.

Float member 50 includes three wing segments 70 arranged in circumferentially spaced-apart relation and appended to a central tube or post 72 as shown in FIGS. 4–6. Central post 72 includes an axially extending chamber 69 sized to receive a compression spring 71 therein as shown in FIGS. 4 and 5. Spring 71 applies an upwardly directed force to float member 50 by acting against dome 51 and base 58 to assist in lifting float member 50 whenever float member 50 is exposed to rising levels of liquid fuel 20. A radially extending space or slot 74 is formed to lie between each pair of adjacent wing segments 70 to receive one of the guide ribs 62 as shown, for example, in FIG. 6. It is understood that the number of slots 74 in float member 50 will vary with the number of guide ribs 62 in accordance with the present invention.

Each wing segment 70 illustratively includes radially extending first and second spoke walls 76, 78 and exterior and interior annular walls 80, 82. As shown best in FIGS. 4 and 6, first spoke wall 76 is appended to central post 72 and to one end of each of the exterior and interior annular walls 80, 82 and second spoke wall 78 is appended to central post 72 and to another end of each of the exterior and interior annular walls 80, 82. These walls 76, 78, 80, and 82 are arranged, for example, as shown in the drawings to define first and second axially extending flow passages 84, 86 through each wing segment 70. As described below, the transverse cross-sectional shape (e.g. arcuate, narrow width, long arc length) of these flow passages 84, 86 is sized so that liquid fuel 20 reaching the entrance to these flow passages 84, 86 will tend to agglomerate in the passage entrances momentarily to block flow of liquid fuel 20 through the flow passages 84, 86 owing, at least in part, to surface tension and/or viscosity of the liquid fuel 20, thereby momentarily increasing the effective surface area of the bottom of the float member 50. Liquid fuel agglomerating in the passage entrances along with adjacent lower edges of various walls 72, 76, 78, 80, 82 included in float member 50 function to define (for at least a suitable short period of time) an effective "solid" bottom wall having a rather large effective surface area. This will cause float member 50 to move quickly to a vent outlet-closing position in the manner described below. Although two passageways are illustrated, it is understood that greater than two passageways may be used so long as the size and shape of the passageway is sufficient to cause a momentary blockage of fluid flow therethrough when the passageways are first exposed to the rising liquid fuel.

Base 58 is shown in FIG. 4 and includes a circular plate 88 with, for example, three annular slots 90. The slots 90 are arranged to lie near and extend around the perimeter edge of circular plate 88. Base 58 also includes a protrusion 92 sized to fit into the chamber 52 formed at one end of central post 72 included in float member 50. Protrusion 92 has a cross-shaped transverse cross section. In addition, central axis 66 extends through protrusion 92. It is understood, however, that the protrusion 92 may take on a variety of shapes and sizes so long as protrusion 92 lies within chamber 52 when float member 50 rests upon the base 58.

Container lid 30 includes a downwardly facing plate 94 lying inside annular mounting flange 42 as shown in FIGS. 4 and 5. Lid 30 also includes an annular rim 96 configured to carry an O-ring seal 98 and sized to fit inside upper flange 36 on valve container 28 to trap O-ring seal 98 between container lid 30 and valve container 28 as shown in FIG. 5. O-ring seal 98 is urged against an annular inner wall 99 included in container 28 in radially inwardly spaced-apart relation to annular upper flange 36 as shown in FIG. 5.

Plate 94 in container lid 30 is formed to include an aperture 110 positioned to lie between annular rim 96 and annular mounting flange 42 as shown in FIGS. 4 and 5 to conduct fuel vapor in vapor space 22 into pressure-relief module 46. As shown in FIG. 1, pressure-relief module 46 includes a shell 112 that defines a chamber 114. Chamber 144 provides a flow passageway between aperture 110 and second output tube 48. Pressure-relief module 46 also includes an annular valve seat 116 in chamber 114 and around aperture 110, a pressure-relief valve 118, a cap 120 for closing an open end of shell 112, and a spring 122. The spring yieldably urges the pressure-relief valve 118 into sealing engagement with the underlying annular valve seat 116 normally to block discharge of fuel vapor from tank vapor space 22 from pressure-relief module 46 through second outlet tube 48.

As shown, for example, in FIG. 5, valve container 28 includes a top wall 124 coupled to inner surface 64 of cylindrical sleeve 32 and formed to include venting outlet 126 and a shield 128 overlying venting outlet 126. Shield 128 is integrally appended to top wall 124 in the embodiment shown in FIG. 5. Valve container 28 also includes an internal annular lip 129 that supports base 58 in its mounted position in container chamber 52. Base 58 supports float member 50 as shown, for example, in FIG. 5 until the level liquid fuel 20 in tank 14 rises to cause float member 50 to move toward its closed position. A ramped wall 131 is formed in cylindrical sleeve 32 as shown in FIG. 5 to aid in guiding relative movement between base 58 and sleeve 32 during installation of base 58. Ramped wall 131 aids in ramping base 58 up and over annular lip 129 so that base 58 seats properly against an upwardly facing surface of annular lip 129 following installation of base 58 within chamber 52.

A perspective view of float member 50 by itself is shown in FIG. 4a. The dome 51 of the float member 50 carries a nipple 57. The dome 51 and nipple 57 function as a lower closure member 55 and cooperate with upper closure member 54 to close the venting outlet 126 formed in valve container 28 as shown in FIG. 7. As shown in FIG. 5, dome 51 and nipple 57 are positioned to lie in an upper region 81 inside the central tube 72 provided in float member 50. Dome 51 has a lower flange 83 that is appended to a cylindrical inner wall 75 of central tube 72 and arranged to engage a top end 77 of compression spring 71. An axially upper edge 79 of central tube 72 is formed to include a radially inwardly extending annular retaining lip 73.

Referring now to FIGS. 4 and 5, upper closure member 54 is formed to include a closure disk 130 and a conical valve seat 132 depending from closure disk 130. Closure disk 130 and valve seat 132 are made of a gasket seal-type of material. Conical valve seat 132 is arranged to funnel the nipple 57 on the underlying float member 50 to a position closing the opening 59 formed in the closure disk 130 upon engagement of upper closure member 54 and the underlying float member 50. Frame 56 includes a plate 134 for supporting closure disk 130 and several legs 136 depending from plate 134. Each leg 136 had an outturned foot 138 configured to engage the annular retaining lip 73 formed on central post 72 in float member 50 as shown, for example, in FIGS. 8 and 9. Plate 134 is formed to include an aperture 140 receiving the conical valve seat 132 therein as shown, for example, in FIG. 5.

In operation, the upper and lower closure members 54, 55 cooperate to block flow of both liquid fuel and fuel vapor out of fuel tank 14 through venting outlet 126 during certain circumstances. If the level of liquid fuel 20 in tank 14 is low and undisturbed as shown in FIG. 5, then float member 50 is inactive and rests on base 58 to compress spring 71 so that upper and lower closure members 54, 55 are kept away from engaging top wall 124 and closing venting outlet 126. Fuel vapor in vapor space 22 is thus able to vent through valve assembly 10.

Occasionally, liquid fuel 20 is agitated during operation of a vehicle (not shown) containing fuel tank 14. Such agitation often occurs during movement of the vehicle, especially during cornering, and can cause liquid fuel to slosh around inside fuel tank 14 as shown, for example, in FIG. 7. Float member 50 is configured to jerk upwardly toward top wall 124 in response to a liquid fuel wave as shown in FIG. 7 to cause upper and lower closure members 54, 55 to cooperate to close venting outlet 126. This sudden closure is the result of the liquid fuel 20 splashing through slots 90 and against the first and second flow passages 84, 86 formed in the wing segments 70 of the float member 50. When fluid 20 first hits the openings into these passages 84, 86, the openings become blocked momentarily owing to surface tension and/or viscosity of the liquid fuel 20 agglomerating in the passage openings. This momentary blockage produces an effect similar to what would happen if the float member had a "solid" bottom wall exposed to rising levels of liquid fuel 20. In the case of float member 54, there is an apparent increase in displaced volume of liquid fuel 20 that leads to quicker initial closure of venting outlet 126. In effect, using agglomerations of liquid fuel 20 to close momentarily the lowermost openings into flow passages 84, 86 formed in float member 50 acts to temporarily "enlarge" the effective surface area of the bottom wall of the float member 50 so that more liquid fuel 20 can be displaced, causing float member 50 to actuate and close more quickly.

Valve assembly 10 is shown in its closed position in FIG. 7. At this stage, liquid fuel 20 in tank 14 has raised float member 50 upwardly far enough so that upper closure member 54 engages the top wall 124 to close the venting outlet 126 formed in the top wall 124. Upward movement of float member 50 causes the nipple 57 in lower closure member 55 to engage conical valve seat 132 on upper closure member 54 and direct closure disk 130 in an upward direction until it seats against top wall 124. At the same time, the nipple 57 closes the normally open opening 59 formed in closure disk 130 so that liquid fuel 20 is unable to flow through opening 59 to reach venting outlet 126. As shown in FIG. 7, escape of liquid fuel and fuel vapor from tank 14 is blocked because a first fluid and vapor seal is established between top wall 124 and upper closure member 54 and a second fluid and vapor seal is established between upper and lower closure members 54, 55.

After the float member 50 has reached its closed position, it will move according to the sustained liquid fuel levels relative to the valve assembly 10. For example, after the momentary blockage of the passageways 84, 86, the rising liquid fuel will flow into the passageways 84, 86. If the fuel 20 rises to a sufficient level to create a buoyant force sufficient to float the float member 50, the member 50 will remain in its closed position. The float member 50, will however return to its neutral position shown in FIG. 5, when the fuel level 24 drops within tank 14.

Therefore the float member 50 will sink under its own weight toward its rest position shown in FIG. 5 as soon as the fuel sloshing subsides and the risk of liquid fuel carry-over to the vapor-recovery canister through the venting outlet 126 is reduced. This movement allows the upper and lower closure members 54, 55 to move to their venting positions as shown in FIGS. 8 and 9.

It has been observed that valves that are movable to engage overlying valve seats and close venting apertures formed in such valve seats have a tendency to remain in the closed position during high tank pressure because of a high-pressure differential acting on such a valve. This is especially evident in cases where the venting aperture has a relatively large inner diameter. See, for example, the disclosure in U.S. Pat. No. 5,028,244. The closure system of the present invention is designed to allow some pressurized fuel vapor to vent through opening 59 in such a way as to help unseat upper closure member 54 from its closed position against top wall 124 in case upper closure member 54 becomes temporarily "held" in its closed position by the above-described pressure differential.

As shown in FIG. 8, float member 50 has begun to move downwardly in the fuel tank 14 from the position shown in FIG. 7 because sloshing of fuel in fuel tank 14 has subsided and the level of fuel exposed to the float member 50 has decreased. The nipple 57 on lower closure member 55 is appended to float member 50 and moves in a downward direction along with float member 50. The nipple 57 in lower closure member 55 is small enough in size that it typically does not experience any problems in moving to an opened position. As soon as the nipple 57 moves downwardly with the float member 50 under the force of gravity, nipple 57 easily disengages valve seat 132 in upper closure member 54 to permit flow of some pressurized fuel vapor in valve container 28 to pass into opening 59 and travel through the venting outlet 126 in a direction around shield 128 toward first outlet tube 44. As shown in FIG. 7, a portion of an upper surface 127 of the closure disk 130 lying adjacent to venting outlet 126 will be exposed to the higher pressure of this pressurized fuel vapor that is vented through opening 59. This vented pressurized will act to apply a downward force to the exposed portion 127 of closure disk 130 that is sufficient to assist in moving the upper closure member 54 from the seated position shown in FIG. 8 to the unseated position shown in FIG. 9.

At or about the same time, the flange 73 appended to the central tube 72 of float member 50 will engage the outturned feet 138 formed on frame 56 used to support upper closure member 54. As float member 50 continues to move in a downward direction, this engagement of flange 73 and feet 138 will cause float member 50 to pull the frame 56 and the attached upper closure member 54 positively away from engagement with the underside of top wall 124 to the unseated position shown in FIG. 9.

Float member 50 incorporates wing segments 70 that are configured to allow fuel vapor to pass therethrough and to pilot float member 50 in the chamber 52 formed in valve container 28. Wing segments 70 also provide displacement volume for greater buoyancy for fixed height of float member 50. Passages 84, 86 through wing segments 70 restrict and therefore retard fluid flow therethrough due to viscosity of fluid momentarily providing an apparent increase in displaced volume and increasing buoyancy of float member for faster closure. Thus, float member 50 is able to react quickly to rising liquid fuel. These flow passages 84, 86 are thus sized and shaped to maximize buoyant displacement of float member 50. Float member 50 is configured to provide a differential in flow restriction between fuel and vapor at high flow rates. This differential results in rapid float closure with rapidly rising liquid fuel levels but the float remains open with only vapor flow.

Another embodiment of a tank venting control system 192 of the present invention is shown in FIG. 10 and several views of the float member illustrated in FIG. 10 are shown in FIGS. 11–13.

Control system 192 includes a vent apparatus 262 and an elongated tubular skirt 266. The tubular skirt 266 shown in FIG. 10 has a set of first connector portions 269 to couple an uppermost end 270 of tubular skirt 266 to overlying vent apparatus 262. The connector portions 269 of the skirt 266 permit the vent apparatus 262 to be interchangeable with skirts 266 of different lengths. The vent apparatus 262 controls fuel vapor venting through aperture 234 in fuel tank 198. Vent apparatus 262 is designed to be mounted in the aperture 234 formed in the top wall 232 as shown, for example, in FIG. 10. Vent apparatus 262 includes a valve housing 280. Housing 280 is formed to include a partition 238 having a valve seat 194 that defines a vapor-inlet opening 286 having a first dimension 287. In addition, the housing 280 includes a vapor-outlet opening 288 interconnected in fluid communication with the vapor-inlet opening 286 by a passageway 284. The vapor-outlet opening 288 is connected to the vapor-recovery canister 18. It is understood that opening 288 may be coupled to a wide variety of treatment apparatuses in accordance with the present invention.

Valve housing 280 of vent apparatus 262 is formed to include a hollow interior that is divided into a lower chamber 289 and an upper chamber 290 defined by passageway 284 as shown, for example, in FIG. 10. Upper chamber 290 of valve housing 280 is formed to include a first outlet 190 defining the vapor-outlet opening 288. First outlet 190 is coupled to vapor-recovery canister 18. Valve housing 280 also includes an inlet 196 for communicating pressurized fuel vapor discharged from run-loss valve (not shown) into the valve housing 280. Valve housing 280 is thus a part of two vent paths for pressurized fuel vapor being discharged from fuel tank 198 to vapor-recovery canister 18.

Rollover valve assembly 210 includes a first nipple 236, a second nipple 237, a float member 235 and a rollover spring 292 arranged and movable to control liquid fuel and fuel vapor discharge from the fuel tank 198 through the venting inlet aperture 286. This controlled discharge may occur in a variety of instances. For example, fuel vapor may be discharged from tank 198 as liquid fuel sloshes in the fuel tank 198 during vehicle movement and when high pressure develops in the fuel tank 198. In addition, fuel vapors may be discharged from fuel tank 198 when the tank 198 is filled with liquid fuel 20 during refueling and when the fuel tank 198 tilts or is inverted during vehicle rollover.

As shown in FIGS. 10 and 13, the float member 235 includes a top shell 294 formed to include the second nipple 237 at its upper end and a base shell 296 formed to include a downwardly opening annular cavity 298 sized to receive the coiled rollover spring 292 therein. Top shell 294 further includes a dome portion 399 supporting nipple 237. Dome portion 399 includes a top end 400 extending across cavity 377, a bottom end 402 extending into cavity 377, and a side wall 404 extending between top and bottom ends 400, 402. The nipples 236, 237 are arranged and sized to block pressurized fuel vapor and also liquid fuel flow through the vapor-inlet opening 286 formed in partition 238 as shown in FIG. 10.

The base shell 296 of float member 235 is best shown in FIGS. 11 and 12. Float member 235 includes wing segments 370 appended to a central post 372. Central post 372 includes an upper end 373, an opposite lower end 375, a side wall 379, and a cavity 377 extending between upper and lower ends 373, 375. Wing segments 370 include first and second spoke walls 376, 378 and exterior and interior walls 380, 382. As best shown in FIG. 11, the spokes 376, 378 extend between the opposite ends of walls 380, 382 to define a first flow passageway 386 having a second dimension 383. The second dimension 383 is less than the first dimension 287 of the vipor-inlet opening 286 therebetween. In addition a bridge 387 couples each of the interior walls 382 to the central post 372. See FIG. 12. The bridges 387 cooperate with the interior walls 382 and the first and second spokes 376, 378 to define T-shaped passageways 384 through the valve member 235.

The first nipple 236 includes a frame assembly 300 coupled to the float valve 235 to permit relative movement therebetween and a closure member 310 at its tip. The closure member 310 is appended to the frame assembly 300 to face toward the upstream valve seat 194 formed in partition 238. The closure member 310 includes an outer surface 312 configured to fit closely against the conically shaped upstream valve seat 194 so that liquid fuel and fuel vapor are unable to pass between the partition 238 and the first nipple 236 upon sealing engagement of the closure member 310 and the upstream valve seat 194. A gasket 216 is typically provided to ensure a sealing engagement between valve 235 and valve seat 194. The closure member 210, however, is formed to include a bypass passageway 214 extending therethrough, as shown, for example, in FIG. 10, to permit the flow of some fuel vapor into the passageway 284 through the vapor-inlet opening 286 under certain circumstances that will be discussed hereafter.

As best shown in FIG. 13, the second nipple 237 includes a solid closure member 215 having a guide 217 at its tip that faces toward a downwardly facing, conically shaped valve seat 218 formed at the inlet end of bypass passageway 214. The closure member 215 is sized and shaped to block liquid fuel and vapor flow through bypass passageway 214 upon the solid closure member 215 of the second nipple 237 sealing engaging the valve seat 218 of the first nipple 236. The closure members 310, 215 of the first and second nipples 236, 237 are movable relative to the partition 238 and to each other. The nipples 236, 237 aassum nested positions blocking liquid fuel and fuel vapor flow through the vapor-inlet opening 286 to protect the vapor-recovery canister 18 connected to first outlet 190 of valve housing 280 from liquid fuel carryover and to maintain a proper pressure head in a vapor space (not shown) in the fuel tank 198 during refueling.

The frame assembly 300 of the first nipple 236 includes a radially outwardly extending and axially downwardly extending side wall 220 that terminates at an annular base 222 and provides the frame assembly 300 with an inverted cup-like shape. The frame assembly 300 is formed to include an interior region 224 sized to receive the second nipple 237 therein as shown in FIG. 10. A plurality of windows 226 are formed in the side wall 220 to allow fuel vapor to pass into the interior region 224 on its way to the bypass passageway 214 (as long as the second nipple 237 is not moved to its closed position).

A release flange 228 is appended to the top shell 294 of float valve 235 and arranged to lie in the interior region 224 of the frame assembly 300. The release flange 228 extends in a radially outward direction to provide a downwardly facing surface 230 that faces toward an upwardly facing surface 231 provided on frame assembly 300. Sufficient downward movement of float valve 235 in fuel tank 198 will cause the release flange 228 to engage the surface 231 and pull the first nipple 236 away from engagement with the upstream valve seat 214, thereby opening the vapor-inlet opening 286 as shown in FIG. 10. Of course, such downward movement of the float valve 235 happens when fuel is not sloshing around in tank 198 and the risk of liquid fuel carryover to the vapor-recovery canister 18 is low or when the fuel level in the tank 198 is being consumed in the vehicle engine (not shown) and no tank refueling is taking place.

Float-valve housing 335 is formed as a one-piece housing member. The housing 335 includes a top side 250 adjacent the lower chamber 289 of valve housing 280 and an opposite bottom side 252. The housing 335 further includes a center portion 254. The center portion 254 includes solid partitioned members 256 positioned in spaced-apart relation to one another and a bottom plate 258 fixed therebetween. The housing 335 surrounds and supports the rollover valve assembly 210. The spring 292 is placed on the bottom plate 258 of the float-valve housing 335 to act against the base shell 296 of the float member 235 and assist in raising float member 235 toward its closed position and thus closure member 310 against the upstream valve seat 214.

Tubular skirt 266 is formed to include a skirt inlet 240 at a lowermost end 274 of an annular side wall 242. Skirt inlet 240 includes apertures 244 therethrough an upper side wall aperture 246 formed in uppermost end 270 as shown in FIG. 10. The aperture 246 conducts fuel vapor from the fuel tank 198 into channels 248 within the tubular skirt 266 when the apertures 244 in skirt inlet 240 are closed by liquid fuel. The upper side wall aperture 246 is positioned to lie in horizontally spaced-apart relation to the float valve 234.

The tubular skirt 266 surrounds rollover valve assembly 210 and defines the annular channel 248 therebetween. Preferably the skirt incorporates the float-valve housing 235 therein. The channels 248 are positioned between the solid partitioned members 256 and in a spaced-apart relationship. Uppermost end 270 of tubular skirt 266 includes connector portions 269 around its periphery, as shown for example in FIG. 10. These connector portions 269 are arranged to engage mating connectors 268 formed on valve housing 280. As noted previously, such a snap-connector feature facilitates assembly of a modular fill-limit valve including a snap-together vent apparatus 262.

In operation, the float member 235 selectively blocks the flow of liquid fuel and fuel vapors out of the fuel tank 14. Float member 235 operates in a similar manner as float member 50 as shown in FIGS. 7–9 and as previously discussed.

Still another embodiment of the tank venting control system of the present invention is shown in FIG. 14. A tank venting control system 351 is provided that operates to vent pressurized fuel vapor from vapor space 22 at the proper time and also operates to block unwanted discharge of liquid fuel 20 and fuel vapor from tank 14 through the aperture 12 formed in top wall 26 of tank (not shown).

Figure 17:
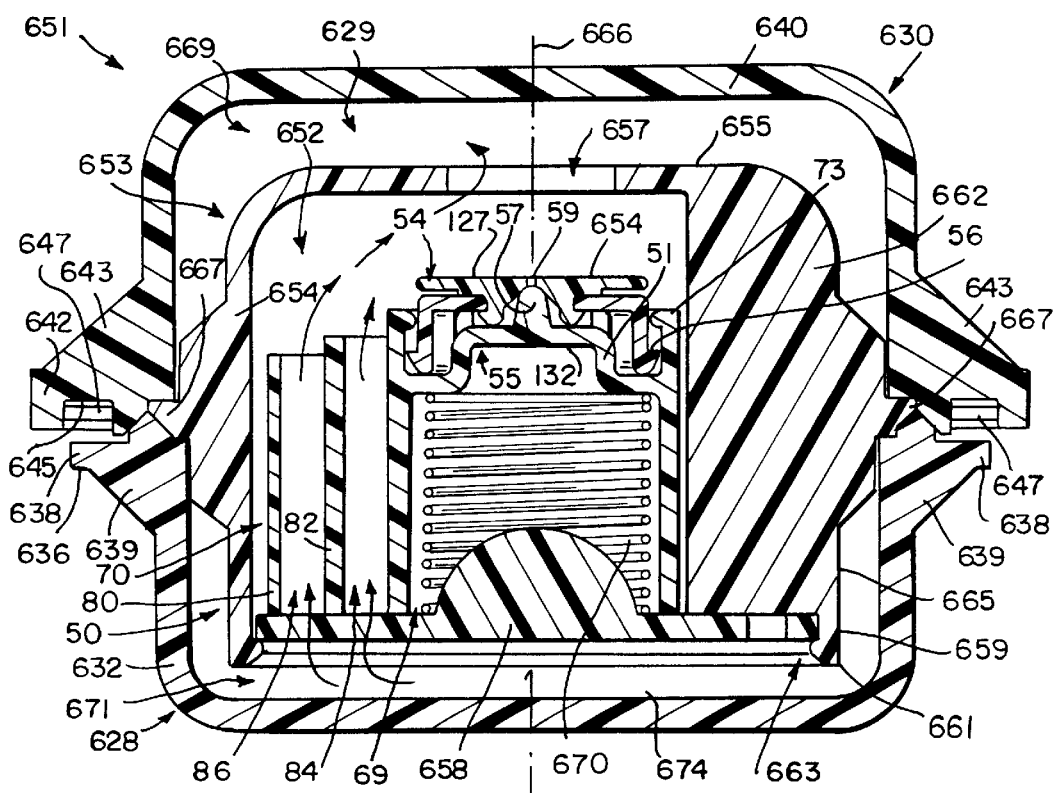
FIG. 17 is a sectional elevation view of the tank venting control apparatus of FIGS. 15–17 taken along lines 18—18 of FIG. 16 showing a float member and upper and lower closures situated in a lowered position away from an overlying venting outlet formed in the valve container.

As shown in FIGS. 14–17, control system 351, includes a valve assembly 651 that has a valve container 628 and a container lid 630 that cooperate to define an interior region 629 therebetween. The valve container 628 includes a cylindrical sleeve 632 having an annular lower rim 634 and an upper flange 636 defining an annular upper rim 638. The upper rim 638 is supported by lower ribs 639 appended to both the upper flange 636 and sleeve 632. Valve container 628 further includes an external radially extending inlet tube 630 coupled to sleeve 632. Container lid 630 includes a closure shell 640 and an annular mounting flange 642 depending from closure shell 640. Container lid 640 also includes an output tube 644 coupled to closure shell 640. The output tube 644 positioned to lie substantially parallel to inlet tube 660. See FIGS. 14 and 16. The mounting flange 642 of the container lid 630 also includes a slot 645 sized to receive a gasket 647 therein. The gasket 647 rests upon a top wall (not shown) of fuel tank to provide a sealing engagement therebetween. See FIG. 17. The valve container 628 is coupled to the container lid 630 as shown in FIG. 17. The valve container 628 is sized for insertion through an aperture formed through the wall of the fuel tank (not shown). See for example FIG. 1.

Valve assembly 651 further includes an internal housing 653 positioned to lie within the internal region 629 between container 628 and lid 630. The internal housing 653 includes an upper wall 655 having a venting aperture 657 therethrough, an opposite bottom end 659 having an axially lower rim 661 defining an open mouth 663, and a side wall 665 extending therebetween. The side wall 665 includes a mounting tab 667 that extends radially outwardly and is mounted between the container lid 630 and the valve container 628. The internal housing 653 partitions the interior region 629 into an upper region 669 and a lower region 671. In addition, valve assembly 651 includes a float member 650 sized to fit into and move up and down in a chamber 652 formed in internal housing 653, an upper closure member 654, a frame 656 configured to support upper closure member 654 and connect to float member 650 to allow for some limited axial movement of float member 650 relative to upper closure member 654, and a base 658 configured to connect to the axially lower rim 661 of bottom end 659 and lie in a float member-supporting position underneath the movable float member 650.

As shown in FIG. 17, an axially extending, sheet-like guide rib 662 is positioned to lie in internal housing 653 so that one edge of the guide rib 662 is anchored to an inner surface 364 of wall 665. The guide rib 662 extends in a radial direction from that inner surface 664 toward a central axis 666 extending axially through valve container 628. Although only one guide rib 662 is illustrated in FIG. 17, it is understood that three guide ribs 662 are uniformly spaced apart at 1200 intervals and function to mate with the axially movable float member 650 and block rotation of float member 650 relative to cylindrical sleeve 632 as previously disclosed. Greater or fewer than three guide ribs 662 may be employed without exceeding the scope of the present invention.

Float member 50 is positioned to lie within the internal housing 653 and is best illustrated in FIGS. 4a and 17. Referring now to FIG. 17, a compression spring 670 extends into the chamber formed in the central post of float member 50. Spring 670 applies an upwardly directed force to float member 50 by acting against dome 51 and base 658 to assist in lifting float member 50 whenever float member 50 is exposed to rising levels of liquid fuel 20.

Base 658 is shown in FIG. 17 and includes a circular plate 688 formed to include, for example, three annular slots 690 arranged to lie near and extend around the perimeter edge of circular plate 688. Base 658 also includes a protrusion 692 sized to fit into the open mouth 663 formed at bottom end 659 of the central post of the float member 50. It is understood that the base 658 may be coupled to the internal housing in a wide variety of manners without exceeding the scope of the present invention.

In operation, rising fuel vapors and liquid fuel within the fuel tank (not shown) enter the fill limit valve assembly 651 through a passageway 672 defined by the inlet tube 660. The fuel vapor and liquid fuel flow through the lower region 671 as shown by arrows 674 and through apertures (not shown) in the base 658. As previously discussed, when the fuel level hits the bottom of the float member 50, the float member 50 jerks in an upward direction away from the rising fuel 20. Specifically, the float member will immediately rise and the upper closure member 54 will engage the upper wall 655 of the internal housing 653 and close the venting aperture 657. Once the initial fuel flow decelerates, the float member 50 settles to is normal buoyancy level and floats upon the liquid fuel (not shown) present within the chamber of the control system.

Figure 18:
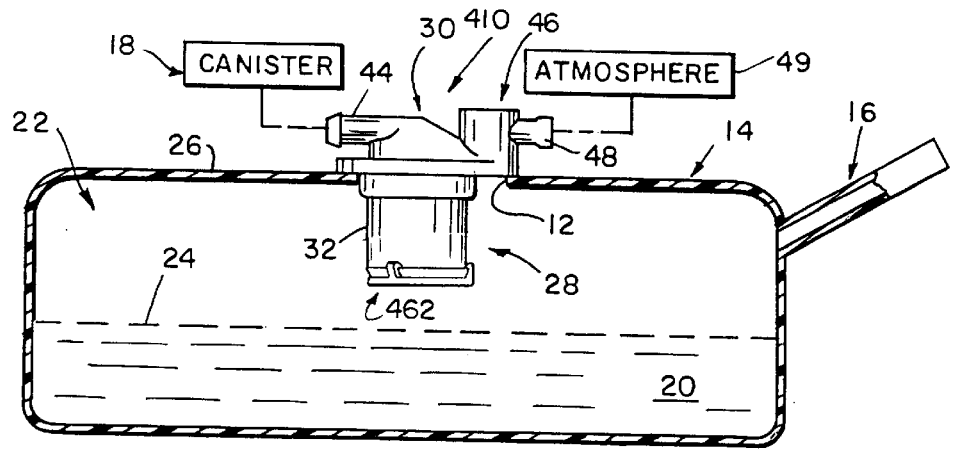
FIG. 18 is a diagrammatic view of a tank venting control apparatus in accordance with another embodiment the present invention mounted in a fuel tank having a filler neck.

In another alternative embodiment of the present invention a tank venting control system 410 is provided and is illustrated in FIGS. 18–25. Referring to FIG. 18, control system 410 is mounted in an aperture 12 formed in a fuel tank 14 having a filler neck 16 as shown in FIG. 18, to regulate flow of liquid fuel and fuel vapor from tank 14 to a vapor recovery canister 18 or other destination outside tank 14.

Figure 19:
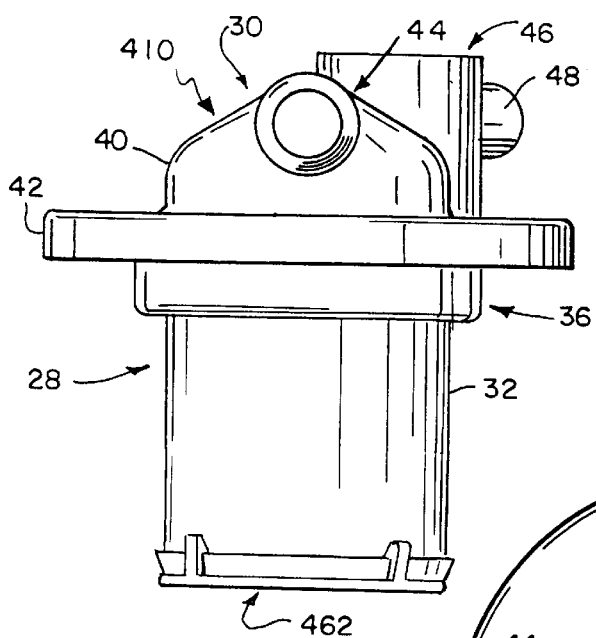
FIG. 19 is a side elevation view of the tank venting control apparatus of FIG. 18 showing the control apparatus including a container lid, a valve container, and a floor.
Figure 20:
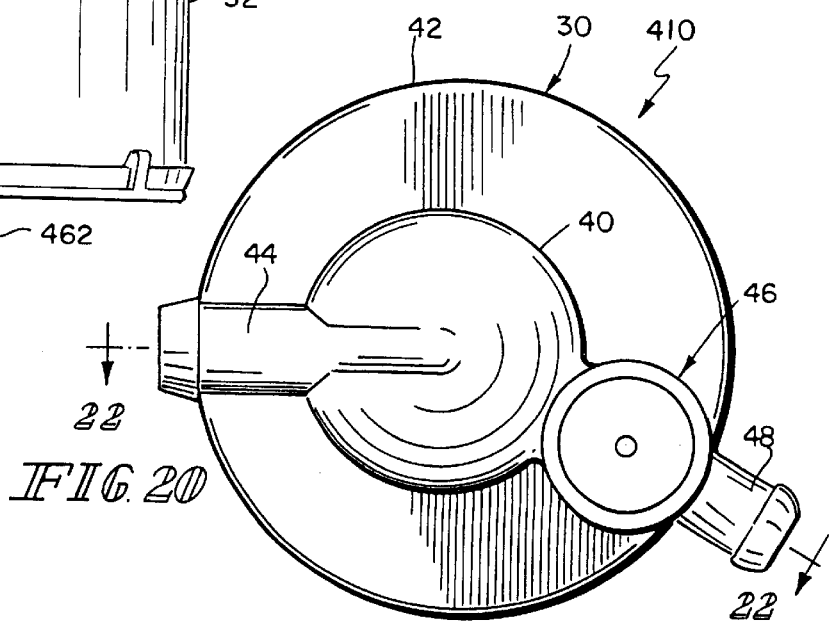
FIG. 20 is a top plan view of the tank venting control apparatus of FIG. 19 showing the container lid including a closure shell and output tubes.

As shown in FIGS. 19–20, control system 410 includes the valve container 28 and the container lid 30 of FIGS. 1–9. In addition control system 410 includes a floor 462 and a base 458. The base 458 includes a circular plate 488 with, for example, three annular slots 490 arranged to lie near and extend around the perimeter edge of circular plate 488. Base also includes a hemispherical-shaped protrusion 492 sized to fit into an open mouth formed at one end of central tube 72 included in float member 50. Protrusion 492 may have a wide variety of shapes and sizes in accordance with the present invention.

The base 458 of valve assembly 410 defines a fill-limit valve housing 450 adjacent the annular lower rim 34 of sleeve 32 within valve container 28. A float valve 452 is positioned to lie inside an interior region 452 of fill-limit valve housing 450 for movement therein. Float valve 452 is movable between an opened position shown in FIGS. 21 and 25, allowing flow of pressurized flow vapor from fuel tank 14 into six annular slots 490 formed in the base 458 and through flow passages 84, 86 in float member 50, and a closed position shown in FIGS. 22 and 24 blocking flow of pressurized fuel vapor from fuel tank 14 into flow passages 84, 86 through annular slots 490. It is understood that greater or fewer than six slots 490 may be formed through base 458 in accordance with the present invention.

The floor 462 is positioned to lie under float valve 452 and is coupled to the sleeve 32 of the valve container 28. The floor 462 includes snap-connectors 464 and a bottom opening 460 extending therethrough as shown, for example, in FIG. 21.

The base 458 defines a top boundary of chamber 452 and lies in vertically spaced-apart parallel relation to floor 462 to position movable float 452 therebetween. The slots 490 of the base 458 interconnect chamber 552 in fill-limit valve housing 550 and flow passages 84, 86 in float member 50 in fluid communication. Float valve 452 includes a bottom wall 473 and a top wall 474 positioned to engage underside 476 of base 458 in chamber 452 to close each slot 490 formed in base 458 to block liquid fuel flow therethrough in response to movement of float valve 452 to its closed position as shown, for example, in FIG. 22.

Movable float valve 452 is formed to include a central aperture 472 and a fine screen 482 coupled to the bottom wall 473 extending across the central aperture 472. The fine screen 482 includes apertures having a width of about 150 to about 500 microns. More preferably, the fine screen 482 is constructed of about 150 micron square weave nylon. It is understood, however the screen 482 may be constructed from a wide variety of materials and include apertures having a wide variety of shapes in accordance with the present invention. In addition, it is understood that the apertures in screen 482 may have a wide variety of dimensions depending upon the vehicle application so long as the screen 482 acts as a liquid discriminator to cause quick movement of float valve 452 toward base 458. The float valve 452 has a density that is less than the liquid fuel and is preferably constructed of nitrophyl closed cell foam. A compression spring 478 rests upon the screen 482 and extends through the central aperture 472 of float valve 452. A lower end of spring 478 engages the screen 482 and an upper end of spring 478 engages the underside 470 of base 458 as shown, for example, in FIG. 21.

The float valve 452 is held on the floor 462 by spring 478. Screen 482 permits fuel vapor to pass therethrough. When however, liquid fuel from slosh conditions hits the screen 482, the float valve 452 immediately moves toward the base 458 to close the slots 490 to prevent liquid carryover. When the liquid retreats from the housing 450, the spring 478 presses the float valve 452 back toward the floor 462.

Figure 21:
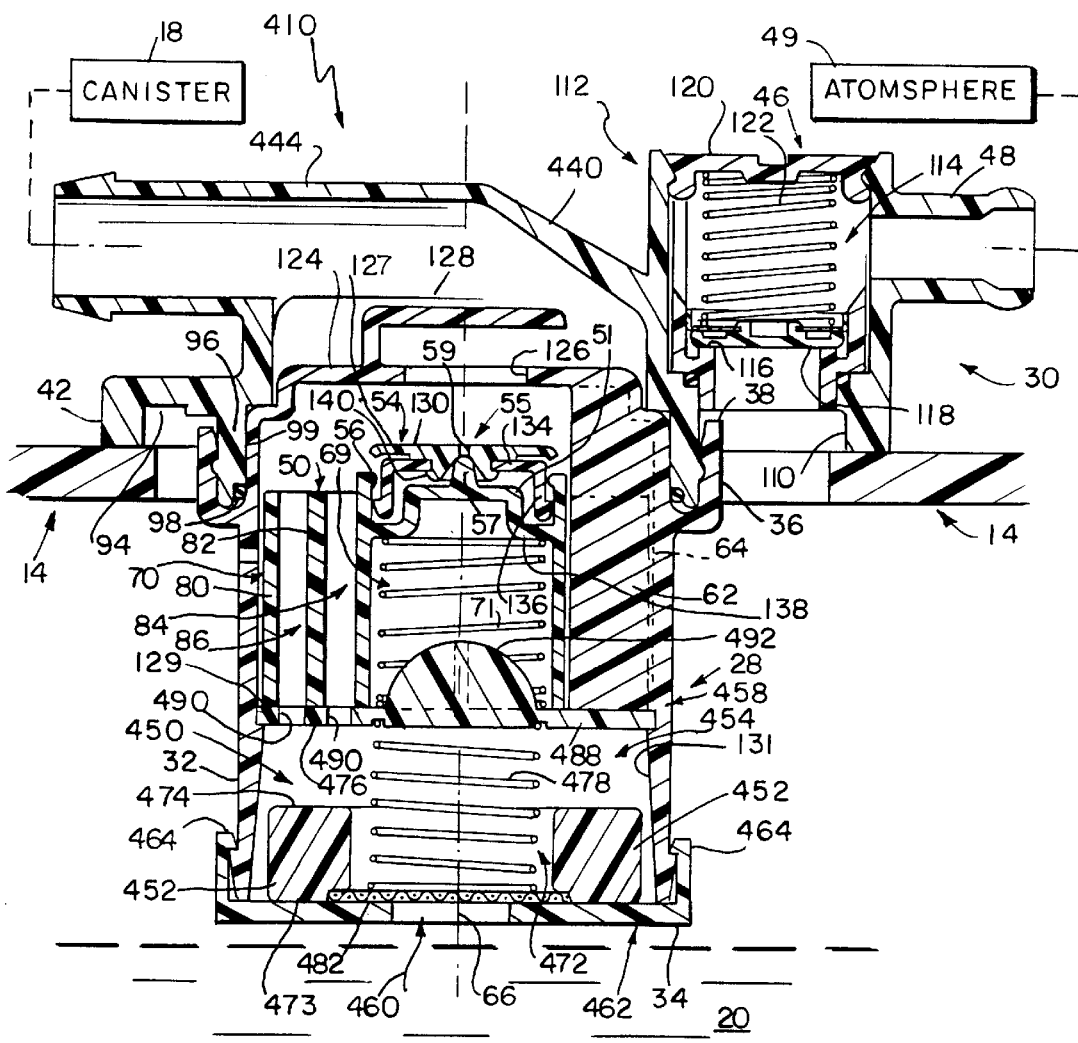
FIG. 21 is a sectional elevation view of the tank venting control system of FIGS. 18–20 taken along line 21—21 of FIG. 20 showing a float member and upper and lower closure members in a lowered position away from an overlying vent outlet formed in the valve container and showing a base coupled to the valve container and the valve container defining a fill-limit valve housing and a float valve situated within the fill-limit valve housing and positioned in a lowered position away from the base.
Figure 22:
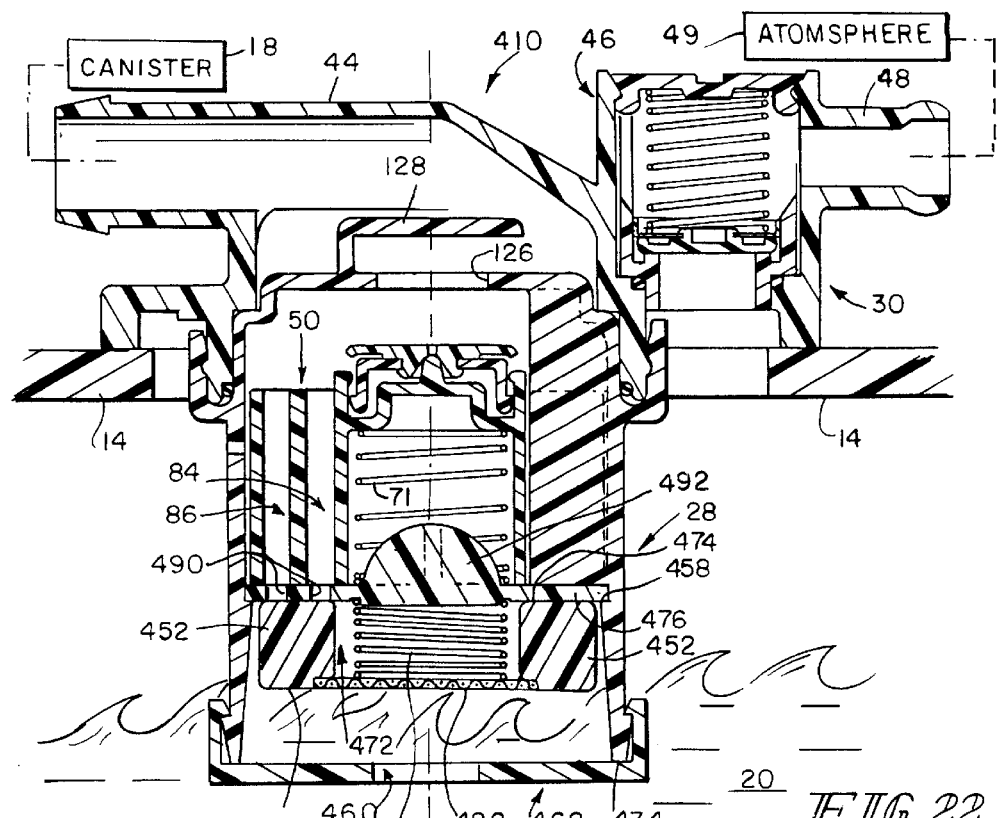
FIG. 22 is a view similar to FIG. 21 showing upward movement of the float valve during fuel sloshing or the like to block slots formed in the base so that liquid carryover from the fuel tank is prevented.

In operation, a rising level 24 of liquid fuel 20 in fuel tank 14 can raise float valve 452 in chamber 552 from an opened position allowing flow of pressurized fuel vapor from fuel tank 14 into slots 490 formed in base 458 through flow passages 84, 86 formed in float member 50 as shown, for example, in FIG. 21 to a closed position shown, for example, in FIG. 22.

In use, the float valve 452 and the float member 50 are each able to react quickly to rising levels of liquid fuel 20 in tank 14 to move upwardly toward top wall 24 of valve container 28. As liquid fuel 20 enters the bottom opening 460 in floor 462, the liquid fuel 20 encounters the fine screen 482. The openings through the screen 482 are blocked momentarily owing to surface tension and/or viscosity of the liquid fuel 20 agglomerating in the openings. This produces an effect similar to what would happen if the float valve 452 had a "solid" bottom wall exposed to rising levels of liquid fuel 20. In the case of float valve 452, there is an apparent increase in displaced volume of liquid fuel 20 that leads to quicker initial closure of slots 490. In effect, using agglomerations of liquid fuel 420 to close momentarily the central aperture 472 formed in float valve 452 acts to temporarily "enlarge" the effective surface area of the bottom wall 473 of the float valve 452 so that more liquid fuel 20 can be displaced, causing float valve 452 to actuate snap against base 458.

In severe fuel sloshing conditions over rough terrain or during sharp turns, fuel 20 may slosh in the fill-limit valve housing 450 at a speed that is greater than the movement of the float valve 452. See FIG. 23. In such instances, fuel 20 will rise through slots 490 in the base 458 and encounter the first and second flow passages 84, 86 formed in the wing segments 70 of the float member 50. The flow passages 84, 86 are sized so that they are blocked momentarily owing to surface tension and/or viscosity of the liquid fuel 20 agglomerating into the passages 84, 86. As previously discussed, agglomerations of liquid fuel 20 temporality enlarges the surface area of the float member 50 and snaps the float member 50 to a closed position. See FIG. 23.

Figure 23:
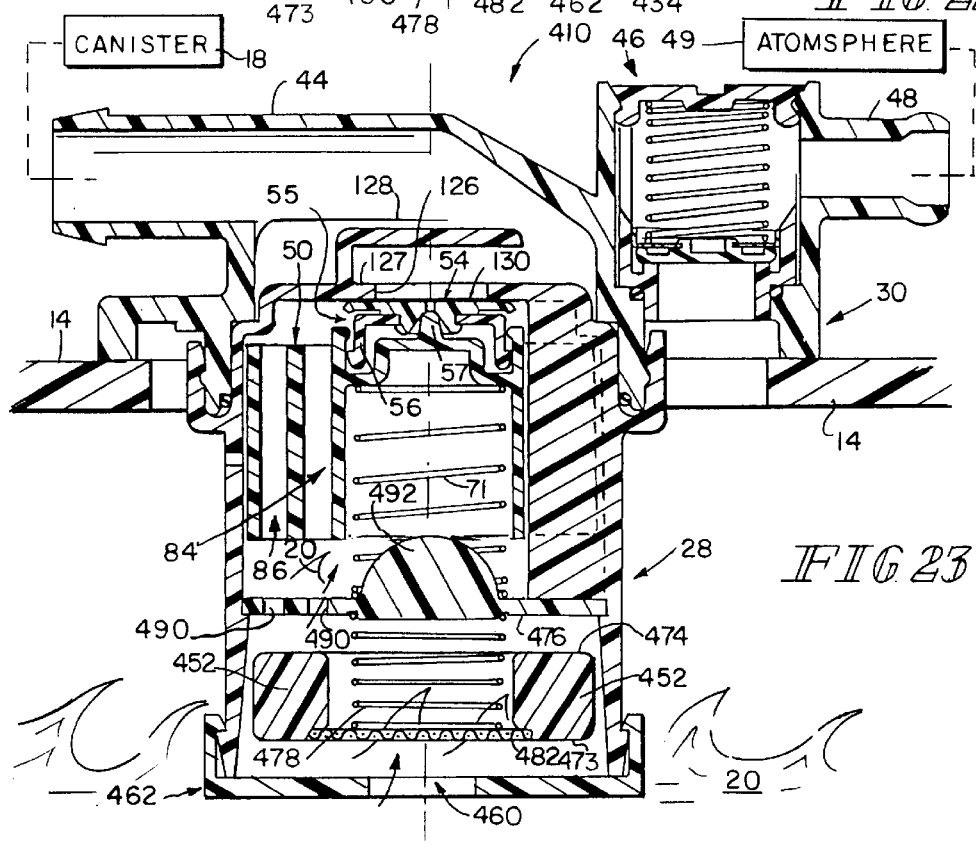
FIG. 23 is a view similar to FIG. 22 showing upward movement of the float member during severe fuel sloshing or the like when the fuel rises faster than the float valve and showing the movement of the upper and lower closure members in an upward direction to close the tank venting outlet formed in the valve container so that liquid fuel carryover from the fuel tank is prevented.

Control system 410 is shown in its fully closed position in FIG. 23. At this stage, liquid fuel 20 in tank 14 has raised float member 50 upwardly far enough so that upper closure member 52 engages the top wall 24 to close the venting outlet 26 formed in the top wall 24. At the same time, the nipple 57 in the lower closure member 55 appended to the float member 50 is positioned to close the opening 59 formed in upper closure member 52. Escape of liquid fuel and fuel vapor from tank 14 is blocked because a first fluid and vapor seal is established between top wall 24 and upper closure member 54 and a second fluid and vapor seal is established between upper and lower closure members 54, 56. As soon as the fuel sloshing subsides and the risk of liquid fuel carryover to the vapor-recovery canister 18 through the venting outlet 126 is reduced, then float member 50 will sink under its own weight toward its rest position shown in FIG. 21.

Figure 24:
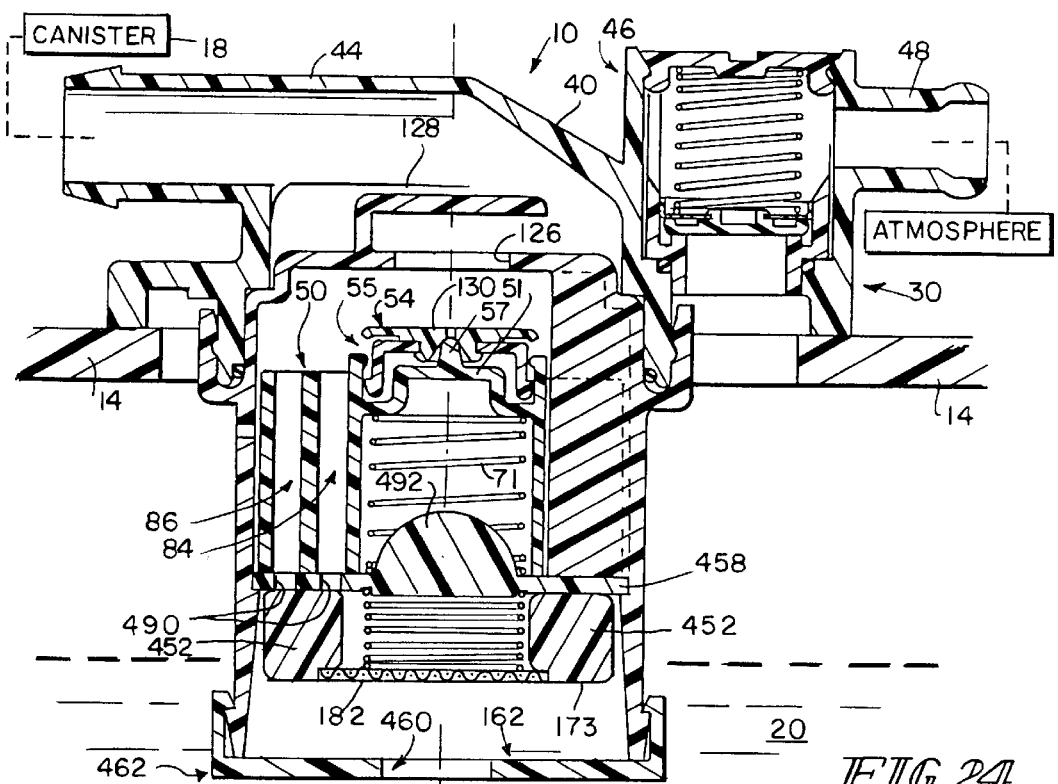
FIG. 24 is a view similar to FIG. 22 showing movement of a buoyant float valve in the fill-limit valve housing to a closed position, blocking flow of liquid fuel and fuel vapor into the flow passages of the valve member through slots formed in the base at the point in time after the liquid fuel level inside the fuel tank has risen to a pre-determined level.
Figure 25:
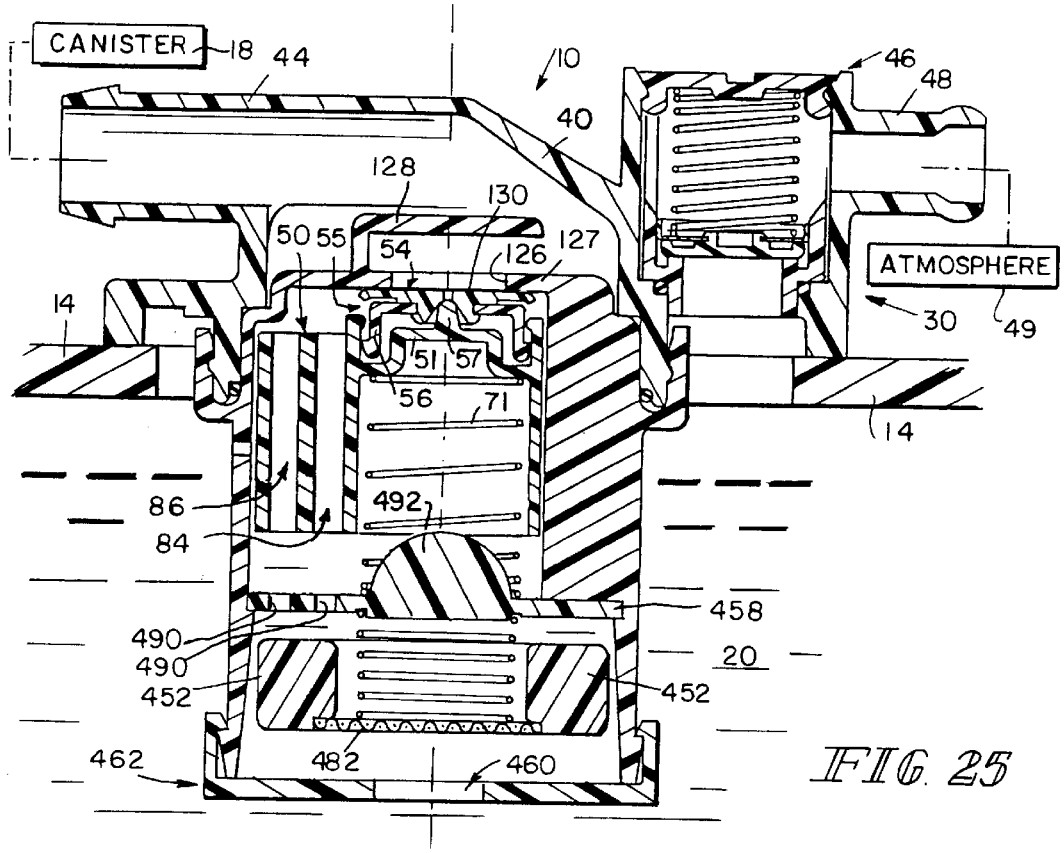
FIG. 25 is a view similar to FIG. 24 showing that if a pump operator continues to add more and more fuel into the filler neck using a trickle-fill technique, the level of liquid fuel in the flow passages of the valve member will ultimately rise to a point high enough to apply a buoyancy force to the valve member to move the valve member to a position closing a venting outlet in the valve container.

Operational stages of control system 410 during a typical fuel tank refueling sequence are shown in FIGS. 21 and 24–25. Initially, the level 24 of liquid fuel 20 in fuel tank 14 is rather low as shown in FIG. 21. At relatively low fuel vapor pressure levels in fuel tank 14, no venting through valve assembly 410 is occurring and both float member 50 and float valve 452 are opened.

During refueling, the top surface 24 of liquid fuel 20 rises and once the level 24 of liquid fuel 20 in fuel tank 14 has risen to a pre-determined level as shown in FIG. 24, float valve 452 in fill-limit valve housing 450 moves to its closed position. This arrests aspiration of displaced fuel vapor in fuel tank 14 and blocks gross passage of liquid fuel 20 into slots 490 in base 458.

At this stage, if a pump operator continues to add more and more liquid fuel into filler neck 16 using the trickle-fill technique, the level 24 of liquid fuel 20 will ultimately rise to a point where it flows around the float valve 452 and through the slots 490 in the base 458 as shown in FIG. 25. Eventually, the level 24 of liquid fuel 20 will rise to a level that is high enough to apply a buoyancy force to valve member 50 to raise valve member 50 to its closed position. This point is reached after a pre-selected successive overfill (i.e., trickle-fill) attempts by a pump operator. That is after a pump operator clicks or squeezes the lever handle on the pump nozzle (not shown) slowly after the first automatic nozzle shut-off has occurred. Once valve member 50 is moved to its closed position as shown in FIG. 25, fuel vapor no longer passes from fuel tank 14 to vapor-recovery canister 26. At this stage, no more liquid fuel can be added to fuel tank 14. As previously discussed, first and second closure members 54, 56 will cooperate to open passageway 126 when the fuel level 24 decreases in tank 14.

Beneficially, a float member in accordance with the present invention provides the user with a quick close mechanism the is activated when the fuel level hits the bottom of the float member. The float member 50 behaves as a liquid discriminator by momentarily blocking the flow of rapidly rising liquid fuel 20 through flow passages 84, 86 that extend through the float member 50. Thus, the float member 50 displaces a large volume of liquid fuel 20 and immediately jerks to a closed position. Once however, the initial fuel flow decelerates and the fuel 20 flows into the flow passages 84, 86, the float member 50 finds its normal buoyancy and float upon the liquid fuel 20. The float member 50 of the present invention will then rise and fall within the valve container 28 as the fuel level 24 increases and decreases. In addition, a float valve in accordance with the present invention provides the user with a secondary valve system that also behaves as a liquid discriminator to cause a rapid valve response to block the flow of liquid fuel 20 toward the float member 50 of the present invention.

Although the invention has been described in detail with reference to a preferred embodiment, variations and modifications exist within the scope and spirit of the invention as described and defined in the following claims.

What is claimed is:

1. An apparatus for controlling discharge of fuel vapor from within a vehicle fuel tank, the apparatus comprising a valve container adapted to be mounted in a top wall of the fuel tank and formed to include an inlet in fluid communication with the fuel tank, an outlet, a side wall extending between the inlet and outlet, and a chamber in fluid communication with the inlet and the outlet, a valve member disposed in the chamber and formed for movement between an open position allowing flow of fuel vapor through the outlet and a closed position preventing flow of fuel vapor through the outlet, the valve member including a central post and wing segments positioned to lie in a spaced apart relationship about the post, the wing segments being forned to define flow passages sized to permit the flow of fuel vapor therethrough and to block momentarily the flow of liquid fuel therethrough, and a secondary float valve disposed between the inlet of the valve container and the valve member and being formed for movement between an open position allowing flow of fuel vapor to the wing segments of the valve member and a closed position blocking flow of liquid fuel to the wing segments.

2. The apparatus of claim 1, wherein the float valve is formed to include a passageway that extends therethrough and a screen that extends across that passageway, the screen including apertures sized to permit the flow of fuel vapor therethrough and to block momentarily the flow of liquid fuel therethrough.

3. The apparatus of claim 2, wherein the float valve includes an upper surface and an opposite lower surface and the screen is coupled to the lower surface.

4. The apparatus of claim 2, further comprising a base being formed to include a slot therethrough, the base being positioned to lie within the chamber between the valve member and the secondary float valve.

5. The apparatus of claim 4, further comprising a compression spring extending between the screen and the base.

6. The apparatus of claim 4, wherein the base is coupled to the valve container and the valve member selectively rests upon the base in the open position.

7. The apparatus of claim 1, further comprising a floor that is coupled to the inlet of the valve container and is formed to include a bottom opening therethrough and the float valve is positioned to lie within the chamber between the floor and the valve member.

8. The apparatus of claim 7, further comprising a base being formed to include a slot therethrough, the base being positioned to lie within the chamber between the valve member and the secondary float valve.

9. The apparatus of claim 8, further comprising a compression spring extending between the float valve and the base and normally urging the float valve toward the floor.

10. An apparatus for controlling discharge of fuel vapor from within a vehicle fuel tank, the apparatus comprising a valve container adapted to be mounted in a top wall of the fuel tank and formed to include an inlet in fluid communication with the fuel tank, an outlet, a side wall extending between the inlet and outlet, and a chamber in fluid communication with the inlet and the outlet, a valve member disposed in the chamber and formed for movement between an open position allowing flow of fuel vapor through the outlet and a closed position preventing flow of fuel vapor through the outlet, the valve member including a central post and wing segments positioned to lie in a spaced apart relationship about the post, the wing segments being formed to define flow passages sized to permit the flow of fuel vapor therethrough and to block momentarily the flow of liquid fuel therethrough, a base defining an upper region and a lower region of the valve container and being formed to include a slot therethrough that is in fluid communication with the upper and lower regions, and a secondary float valve disposed in the lower region of the container and formed for movement between an open position allowing flow of fuel vapor through the slot in the base and a closed position blocking flow of liquid fuel through the slot.

11. The apparatus of claim 10, wherein the base is coupled to the valve container and the float valve is positioned to lie spaced apart from the base in the open position.

12. The apparatus of claim 11, further comprising a floor that is coupled to the inlet of the valve container and is formed to include a bottom opening therethrough and the float valve is positioned to lie within the chamber between the floor and the base.

13. The apparatus of claim 12, further comprising a spring configured to extend between the float valve and the base, the spring normally biasing the float valve toward the floor.

14. The apparatus of claim 10, wherein the float valve is formed to include a passageway that extends therethrough and a screen that extends across that passageway to permit the flow of fuel vapor therethrough and to block momentarily the flow of liquid fuel therethrough.

15. The apparatus of claim 14, wherein the float valve includes an upper surface and an opposite lower surface and the screen is coupled to the lower surface.

16. A fuel vapor control valve for controlling the flow of fuel vapor and liquid fuel through an aperture in a fuel tank having a filler neck, the fuel vapor control valve comprising a housing mounted in the aperture and formed to include an inlet in fluid communication with the fuel tank, an outlet, a side wall extending between the inlet and the outlet and defining a chamber disposed between the inlet and the outlet, a base coupled to the side wall of the housing and being formed to include a slot therethrough, an upper closure member configured for selectively interrupting the flow of fuel vapor through the outlet, and a valve member being formed for movement in the chamber between the outlet and the base, the valve member including a post movably coupled to the closure member and a wing segment coupled to the post, the wing segment defining a flow passage that is sized to permit the flow of fuel vapor therethrough and to retard the flow of liquid fuel therethrough, and a secondary float valve disposed between the inlet of the housing and the base and formed for movement between an open position allowing flow of fuel vapor through the slot in the base and a closed position blocking flow of liquid fuel through the slot.

17. The apparatus of claim 16, wherein the float valve is formed to include a bottom wall, a top wall, and an aperture extending between the top and bottom walls and the top wall engages the base when the float valve is in the closed position.

18. The apparatus of claim 17, wherein the float valve includes means for momentarily blocking the flow of liquid through the aperture to cause movement of the float valve toward the base.

19. The apparatus of claim 18, wherein the blocking means includes a screen extending across the aperture.

20. The apparatus of claim 16, wherein the float valve is formed to include an aperture and a screen that extends across that aperture to permit the flow of fuel vapor therethrough and to block momentarily the flow of liquid fuel therethrough.

21. The apparatus of claim 20, wherein the float valve includes an upper surface and an opposite lower surface and the screen is coupled to the lower surface.

* * * * *